Aug. 4, 1953 K. B. DONNELL 2,647,341
FISHING REEL
Filed March 8, 1950
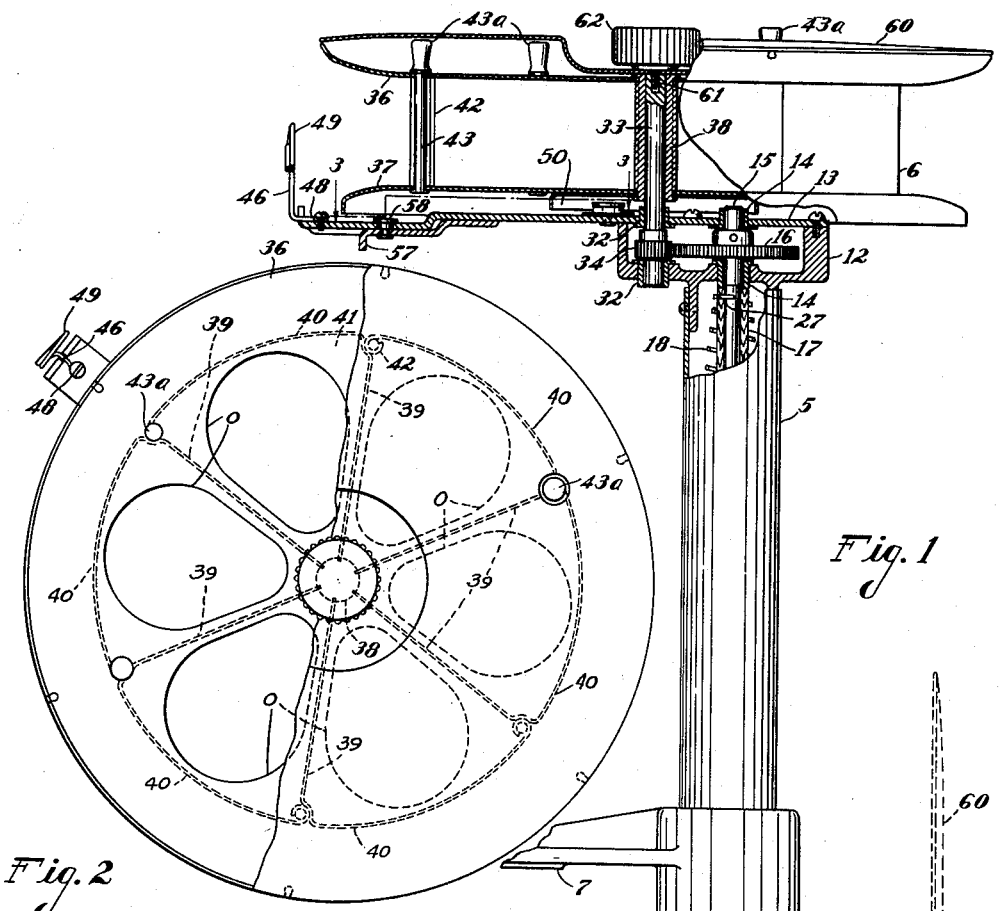
Fig. 1
Fig. 2
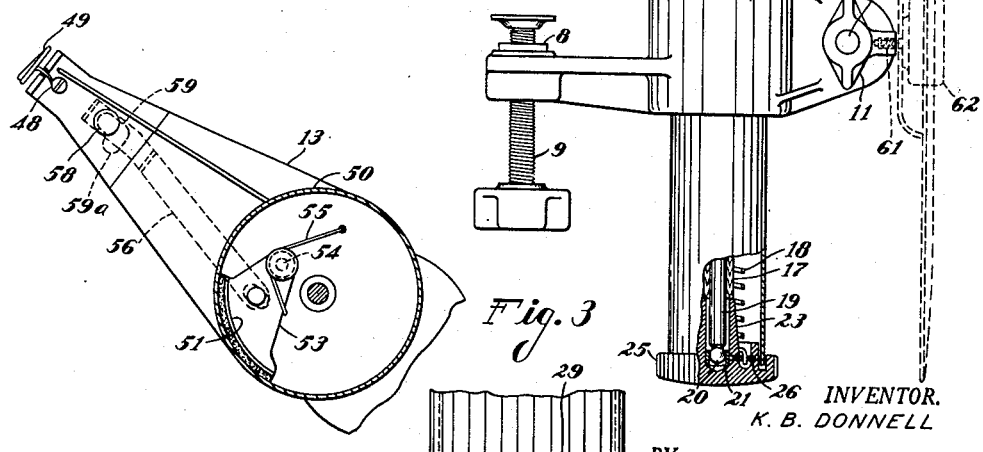
Fig. 3
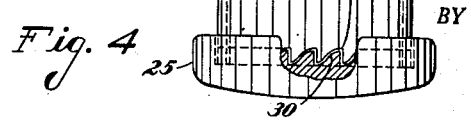
Fig. 4
INVENTOR.
K. B. DONNELL
BY
D. Clyde Jones
ATTORNEY Patented Aug. 4, 1953

2,647,341

UNITED STATES PATENT OFFICE 2,647,341

FISHING REEL

Kenneth B. Donnell, Rochester, N. Y.

Application March 8, 1950, Serial No. 148,355

4 Claims. (Cl. 43—54.5)

This invention relates to a fishing reel.

In applicant's co-pending application Serial No. 83,402, filed March 25, 1949, there is disclosed a method of, and apparatus for manipulating fish lines.

The present invention has for its purpose a fishing reel of improved construction which is especially adapted for practicing the method disclosed in the mentioned application.

A main feature of the invention relates to a fish reel construction which automatically rewinds the fish line when it is being drawn in.

Another feature of the invention relates to an automatic reel which is especially adapted for quantity production at reduced cost and which provides a device that is sturdy and reliable over long periods of service.

Various other features and advantages of the invention will appear from the detailed description and claims when taken with the drawings in which:

Fig. 1 is an elevational view of the improved reel of the present invention with certain parts thereof broken away to illustrate the construction;

Fig. 2 is a plan view of the reel with a portion of the cover broken away to show the construction of the lure-receiving pockets in the top of the reel;

Fig. 3 is a section taken on the line 3—3 of Fig. 1 particularly illustrating the brake construction for the line receiving spool; and Fig. 4 is a detail view of the lower end of the supporting tube as well as the winding knob and cooperating teeth therein to hold the winding knob in its adjusted position with respect to the support.

The automatic reel of the present invention comprises a tubular support 5 and a flattened spool 6 rotatably mounted thereon with its principal plane extending at right angles to the long axis of the support. The support 5 is adapted to be secured in a vertical position so that the flattened spool generally extends in a horizontal direction during use. Means preferably housed in the tubular support, tends to rotate the spool in a given direction for rewinding the fish line thereon. The support 5 has adjustably mounted thereon, a clamp which is provided with spaced jaws 7 and 8 adapted to be placed over the edge of the boat seat or the like. The lower jaw 8 is provided with a clamping bolt 9 which can be tightened to grip the underside of the seat as the upper surface of the seat is engaged by the jaw 8. The clamp is adjustable along the support 5 and can be locked in any position of adjustment by a suitable clamping bolt 10 and butterfly nut 11. The upper end of the tube 5 has secured thereto a cup-shaped gear housing 12 open at its top. This housing is secured to the underside of a supporting plate 13, of the outline indicated in Fig. 3, which plate serves as a cover for the housing and also as a mounting frame on which the spool is rotatably mounted. The supporting plate 13 and the housing 12 are provided with alined bushings 14 to receive a jack shaft 15 on which there is fastened spur gear 16. The shaft 15 is fixed axially in the upper end of a wood dowel 17, the dowel extending substantially throughout the length of the supporting tube to function as a spring arbor or mandrel for a retractile spring 18. The lower end of the dowel 17 has fixed therein a spring arbor shaft 19 extending in axial alinement with the shaft 15. The lower end of the shaft 19 (Fig. 1) terminates in a ball-like head 20 rotatable in the bushing 21. This bushing is carried in the stem 23 of the winding knob 25 which also serves as a closure for the tubular support 5. The winding knob is retained in the support by the rewinding spring 18, the lower end of which loops around a pin 26 carried by the knob. It will be noted that the upper end of the rewinding spring extends through openings in the wood dowel 17 and in the jack shaft 15 as indicated at 27. By this construction, the several parts within the support 5, as well as the winding knob 25, are held in assembled relation by the rewinding spring. In service it may be desirable to change the tension of the restoring spring 18 from time to time. For this purpose the lower edge of the tubular support is provided with teeth 29 to mate with corresponding teeth 30 moulded in the bottom of an annular groove in the winding knob 25. It will be understood that when the tension on the rewinding spring 18 is to be changed, the winding knob 25 is rotated in the proper direction relative to the support 5. During this operation the spring 18 will be extended sufficiently to permit the teeth 30 in the cap to pass over the teeth 29 formed in the lower edge of the support. When the spring 18 is tensioned to the desired amount, this spring will cause the teeth 30 to reengage the teeth 29 and thereby hold the parts in their new position of adjustment.

The gear housing 12 and the supporting plate 13 are provided with alined bushings 32 in which the spool shaft 33 is rotatably supported with its pinion 34 meshing with the spur gear 16. By this arrangement, the spool shaft 33 and the spool 6 secured thereto, are driven by the rewinding spring 18 through the gear 16 and pinion 34, to wind up the line on the spool. As the line is pulled out, the spool is rotated in the reverse direction. This operation rotates the spool shaft 33 which acts through the pinion 34 and the spur gear 16, to wind up the rewinding spring 18 on the winding arbor including the wood dowel 17.

The spool 6 may be of any convenient construction, however, it is preferred to use the arrangement illustrated in Figs. 1 and 2. This arrangement comprises the spaced discs 36 and 37, centrally apertured to receive the respective shouldered ends of hub 38, which ends are peened over to secure these parts together, the hub being secured on the spool shaft 33. The outer portions of the discs 36 and 37 are held in spaced rigid relation by a plurality of radiating partitions 39, each of which is provided with an integral arcuate portion 40. The several arcuate portions afford a cylindrical surface, spaced from the outer edge of the discs, on which surface the fish line can be wound. The radiating partitions 39 together with their related arcuate portions 40 define sector-shaped pockets 41, each of which pockets is accessible through an opening 0 in disc 36 and is adapted to receive one of the several lures attached to the fish line.

In the preferred construction, the inner end of each partition 39 is received in a longitudinal slot in the hub 38 (Fig. 2) while the free end of the arcuate portion 40 thereof terminates in a collar 42 formed thereon. The partitions are fixed in assembled relation by a plurality of headed posts 43, one of which passes through a pair of registering openings in the discs 36 and 37 and also through one of the collars 42. A shoulder on the upper end of each post 43 engages the outer surface of the disc 36, while the lower end of each post is peened over at the under side of the disc 37 to hold the various parts of the spool rigidly together. The head 43a of each post is adapted to have a single turn of the fish line and of a leader, at a point adjacent its lure, wound thereon to afford a snubbing action, while the lure can be stored in a pocket 41. Each head 43a can also serve as a knob by which the spool can be rotated manually.

It has been found to be desirable to provide a fixed guide 46 through which the line and its leaders pass in being wound on or in being unwound from the spool. This guide comprises a wire anchored at 48 on one side of the frame (Figs. 1 and 3) and an upright portion terminating in a loop 49 formed from several turns of the wire.

The reel of the present invention, is provided with a brake which can be positioned, to resist the rotation of the spool on the support and which can be released to permit free rotation of the spool. This brake includes a brake drum 50 in the form of an inverted cup secured at its center portion on the lower end of the hub 38 in parallel relation to the disc 37. A brake shoe 51 faced with leather is carried on the brake shoe arm 53. This arm is pivoted at 54 on the frame and is normally urged by the hairpin spring 55 to hold the leather of the brake shoe in contact with the inner rim of the brake drum. Under certain conditions it is desirable to latch the brake in its disengaged position. To this end, a link 56 has one of its ends pivoted at an intermediate point on the brake shoe arm 53. The other end of the link terminates in a downturn portion 57 (Fig. 1) which serves as a handle for manipulating the brake. At a point near this handle, the link is provided with a retaining and guiding rivet 58. As this link is operated in manipulating the brake, this rivet moves in an L-shaped slot 59 in the frame. When the link has been moved inward to release the brake, the handle 57 of the link can be moved sidewise so that the rivet 58 can be engaged in the portion 58a of the slot whereby the brake can be latched in its released position.

It has been found convenient to provide a cover 60 for the several pockets 41, which cover retains the several lures in their respective pockets during transportation and also tends to prevent rain from accumulating in the pockets. The cover 60 which is preferably of the same size as the disc 36, carries at its center, a captive screw 61 with its attached turning knob 62. This new can be screwed into the upper end of the spool shaft 33 when the cover is to be fastened on the spool. While the reel is in use, the cover can be fastened on the clamp as shown in dotted lines in Fig. 1.

What I claim is:

1. A combined reel and bait retainer comprising a flattened spool including a hub, two discs mounted in spaced relation on the respective ends of said hub, partitions bridging the space between said discs and radiating from said hub to divide the space between said discs into sector-shaped bait receiving pockets, one of said discs having openings therein communicating with said pockets, each partition having at its outer end an integral portion extending to the outer end of an adjacent partition whereby the several portions together define a peripheral surface closing the ends of said pockets and on which a fish line can be wound.

2. In a combined reel and bait retainer, a frame, and a flattened spool comprising a hub rotatably mounted on the frame, two discs secured in spaced relation on the respective ends of said hub, partitions bridging the space between said discs and radiating from said hub to divide said space into sector-shaped bait pockets, each partition having at its outer end an integral arcuate portion extending to the outer end of an adjacent partition, the several portions together defining a peripheral surface closing the ends of said pockets and on which a fish line can be wound, one of said discs having openings therein communicating with said pockets.

3. In a combined reel and bait retainer, a frame, and a flattened spool comprising a notched hub rotatably mounted on the frame, two discs secured in spaced relation on the respective ends of said hub, a cooperating post radially opposite each notch in the hub, said posts being mounted in the borders of said discs and limiting the separation of said borders, partitions substantially bridging the space between said discs and radiating from the respective notches in said hub and toward the respective cooperating posts to divide said space into sector-shaped pockets, each partition having at its outer end an integral portion extending from its related hub to the outer end of an adjacent partition and terminating in a connection to the cooperating post of the adjacent partition, the several integral portions together defining a peripheral surface closing the ends of said pockets and on which a fish line can be wound, one of said discs having openings therein communicating with said pockets.

4. In a combined reel and bait retainer, a frame, and a flattened spool comprising a hub rotatably mounted on the frame, two discs secured in spaced relation on the respective ends of said hub, a cooperating post radially opposite each notch in the hub, said posts being mounted in the borders of said discs and limiting the separation of said borders, partitions substantially bridging the space between said discs and radiating from the respective notches in said hub toward the respective cooperating posts to divide said space into sector-shaped pockets, each partition having at its outer end an integral arcuate portion extending to the outer end of an adjacent partition and terminating in a collar embracing the cooperating post of the adjacent partition, the several arcuate portions together defining a peripheral surface closing the ends of said pockets and on which a fish line can be wound, one of said discs having openings therein communicating with said pockets.

KENNETH B. DONNELL.

References Cited in the file of this patent

UNITED STATES PATENTS

| Number | Name | Date |
| --- | --- | --- |
| 491,955 | Singer | Feb. 14, 1893 |
| 769,142 | Atkinson | Sept. 6, 1904 |
| 1,005,015 | French | Oct. 3, 1911 |
| 1,256,278 | Takeuchi | Feb. 12, 1918 |
| 1,537,956 | Daniels | May 19, 1925 |
| 1,768,981 | Hendrickson | July 1, 1930 |
| 1,975,385 | Bacus | Oct. 2, 1934 |
| 2,367,214 | Hedge | Jan. 16, 1945 |
| 2,470,507 | Luton et al. | May 17, 1949 |

FOREIGN PATENTS

| Number | Country | Date |
| --- | --- | --- |
| 57,415 | Sweden | Oct. 10, 1922 |
| 852,228 | France | Oct. 23, 1939 |